UNITED STATES PATENT OFFICE.

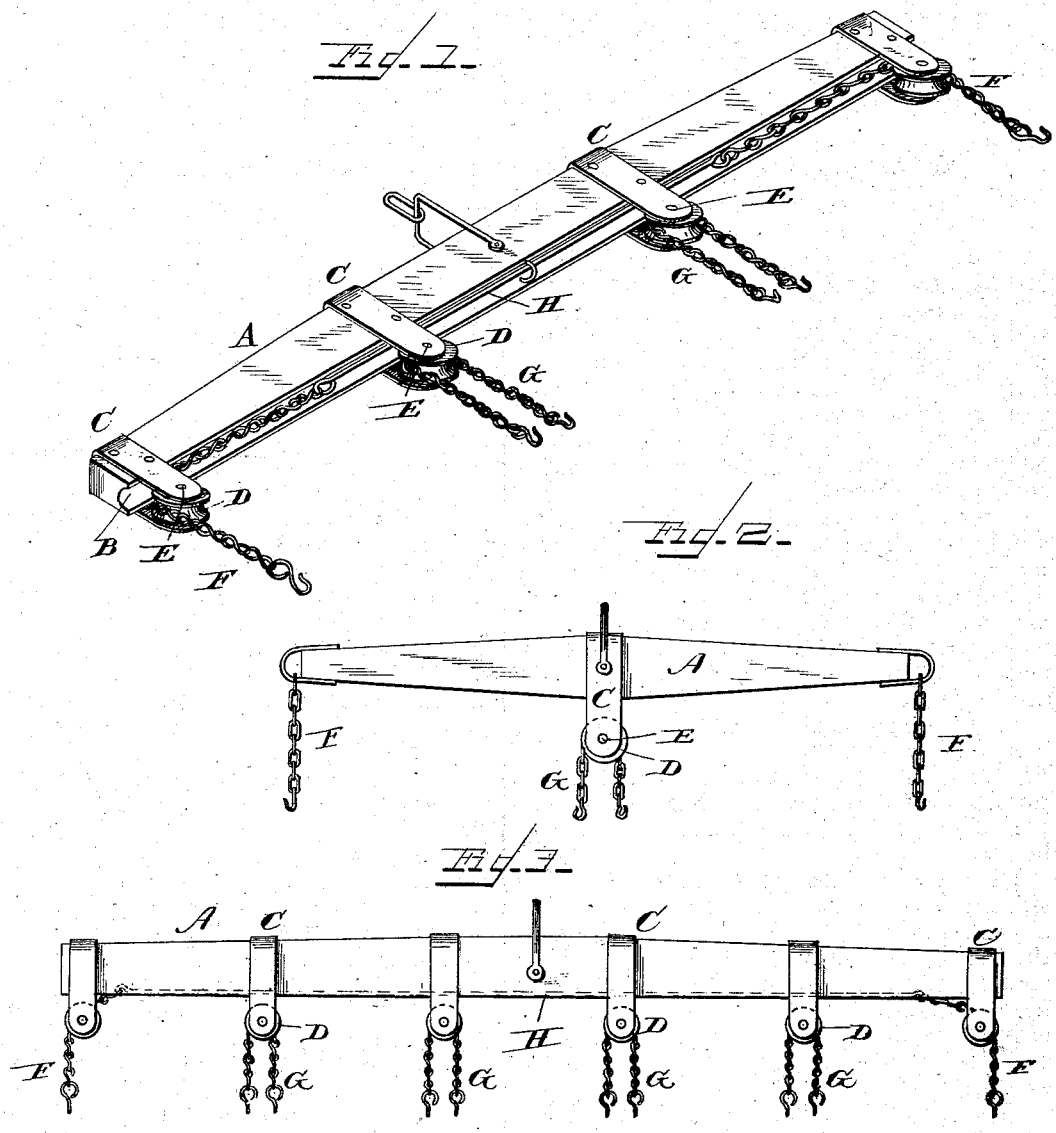

GEORGE W. ARNOLD AND FRED E. ARNOLD, OF IONIA, MICHIGAN.

DRAFT-EQUALIZER.

SPECIFICATION forming part of Letters Patent No. 315,375, dated April 7, 1885.

Application filed August 22, 1884. (No model.)

*To all whom it may concern:*

Be it known that we, GEORGE W. ARNOLD and FRED E. ARNOLD, citizens of the United States, residing as Ionia, in the county of Ionia and State of Michigan, have invented certain new and useful Improvements in Draft-Equalizers, of which the following is a specification, reference being had therein to the accompanying drawings.

This invention has for its object to provide a light, strong, and durable draft-equalizer for plows and other agricultural implements, and for vehicles of various descriptions, and which may be employed with two or more horses, as more fully hereinafter specified. These objects we attain by the means illustrated in the accompanying drawings, in which—

Figure 1 represents a perspective view of our draft-equalizer arranged for three horses; Fig. 2, a top view showing the equalizer arranged for two horses, and Fig. 3 a similar view showing the equalizer arranged for five horses.

The letter A indicates a strong beam or single-tree constructed of wood or other suitable material. The said beam is constructed thickest at its center, and tapers toward the ends for the purpose of strength and lightness. A groove, B, is formed along the front edge of the beam, in which the equalizing-chains may move, as more fully hereinafter explained.

The letter C indicates one or more metallic clips or frames, which are securely fastened to the ends or intermediate parts of the beam at proper points, the number varying to the number of horses to be employed. Between the sides of the clips are secured pulleys D, which turn on bolts E, passing through and secured to the clips. The beam is of sufficient length to reach from the outer tug of the right-hand horse to the outer tug of the left-hand horse. Around the pulleys are passed the equalizing-chains F G. For two horses these are arranged as shown in Fig. 2 of the drawings, the chains F being secured to the ends of the beam, and the chain G passing around the intermediate pulley. For three or more horses the chains G are passed around the additional intermediate pulleys.

In operation, the horses are hitched between the respective pulleys at the ends of the beam, the first horse being hitched to one end of the chain F and to one end of the first chain G, and the last horse is hitched to the other end of the chain F and to one end of the last chain G. Thus it will be seen that the strain upon all the horses, whether two or more are employed, is precisely the same, thus thoroughly equalizing the draft.

In order to prevent any possible engagement or interlocking of the chains F and G, the chain F may be formed with a long link or rod, H, which will move freely in the groove B, and will not interfere with the intermediate chains or injure them by rubbing or breaking.

Having thus described our invention, what we claim, and desire to secure by Letters Patent, is—

The combination, in a draft-equalizer, of the beam A, the clips C, and pulleys D, the chain F, extending along the beam in the groove B and around the pulleys at the end of the beam, and the chain G, extending around the intermediate pulley, substantially as specified.

In testimony whereof we affix our signatures in presence of two witnesses.

GEORGE W. ARNOLD.
FRED E. ARNOLD.

Witnesses:
C. K. CALKINS,
W. F. SOULE.